United States Patent
Cook et al.

(10) Patent No.: US 10,738,486 B2
(45) Date of Patent: Aug. 11, 2020

(54) INSULATION BLOWING MACHINE

(71) Applicant: Owens Corning Intellectual Capital, LLC, Toledo, OH (US)

(72) Inventors: David M. Cook, Ganville, OH (US); Brandon Robinson, Sylvania, OH (US); Christopher M. Relyea, Marysville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 552 days.

(21) Appl. No.: 15/355,413

(22) Filed: Nov. 18, 2016

(65) Prior Publication Data

US 2017/0145701 A1 May 25, 2017

Related U.S. Application Data

(60) Provisional application No. 62/257,364, filed on Nov. 19, 2015.

(51) Int. Cl.
*B02C 18/22* (2006.01)
*E04F 21/08* (2006.01)
(Continued)

(52) U.S. Cl.
CPC ............ *E04F 21/085* (2013.01); *B02C 18/22* (2013.01); *B02C 18/2216* (2013.01); *B62B 1/12* (2013.01);
(Continued)

(58) Field of Classification Search
CPC ..... B02C 18/2216; B02C 18/22; B02C 19/00; B65H 75/14; B65H 75/22; B65H 75/42; B65H 75/34; B65H 2701/33
(Continued)

(56) References Cited

U.S. PATENT DOCUMENTS 2,346,649 A * 4/1944 Bilek ..................... B62B 1/264
280/47.27
3,651,536 A 3/1972 Bolzan, Jr. et al.
(Continued)

FOREIGN PATENT DOCUMENTS

EP 0808642 A1 11/1997

OTHER PUBLICATIONS

Modern Mechanix, "Boy Combines Disappearing Hose Reel and Coal Chute" 2013 (Year: 2013).*

*Primary Examiner* — Adam J Eiseman
*Assistant Examiner* — Bobby Yeonjin Kim
(74) *Attorney, Agent, or Firm* — MacMillan, Sobanski & Todd, LLC

(57) ABSTRACT

A machine for distributing insulation material from a package of compressed insulation material is provided. The machine includes a chute having an inlet end and outlet end. The inlet end is configured to receive the package of compressed insulation material. The chute further has a removable hose hub configured for wrapping with a distribution hose. The removable hose hub is further configured for engagement with opposing flange assemblies such that rotation of the hose hub results in rotation of the flange assemblies. A lower unit is configured to receive the compressed insulation material exiting the outlet end of the chute. The lower unit includes a plurality of shredders and a discharge mechanism. The discharge mechanism is configured to discharge conditioned insulation material into an airstream.

19 Claims, 15 Drawing Sheets

(51) Int. Cl.
  *B65H 75/44* (2006.01)
  *B62B 1/12* (2006.01)
  *B62B 1/26* (2006.01)
  *B62B 5/06* (2006.01)
  *B65G 11/20* (2006.01)
  *B65H 75/14* (2006.01)
  *B65H 75/22* (2006.01)
  *B65H 75/42* (2006.01)

(52) U.S. Cl.
  CPC ................. *B62B 1/26* (2013.01); *B62B 5/06* (2013.01); *B65G 11/206* (2013.01); *B65H 75/14* (2013.01); *B65H 75/22* (2013.01); *B65H 75/42* (2013.01); *B65H 75/4471* (2013.01); *B65H 75/4478* (2013.01); *B65H 2701/33* (2013.01)

(58) Field of Classification Search
  USPC ........................................................ 242/597
  See application file for complete search history.

(56) References Cited

U.S. PATENT DOCUMENTS

| | | |
|---|---|---|
| 4,513,772 A | 4/1985 | Fisher |
| 4,739,535 A | 4/1988 | Schuld et al. |
| 4,903,911 A | 2/1990 | Sepke |
| 4,993,449 A | 2/1991 | Stutzman et al. |
| 5,526,842 A | 6/1996 | Christensen |
| 5,535,910 A * | 7/1996 | Cassel .................... B65F 1/1468 206/508 |
| 6,260,233 B1 | 7/2001 | Wareham et al. |
| 6,503,026 B1 | 1/2003 | Mitchell |
| 6,672,329 B1 | 1/2004 | Brooks et al. |
| 6,802,336 B1 | 10/2004 | Holmquist |
| 7,073,746 B2 * | 7/2006 | Lorenzo Barroso ... B65H 75/22 242/118.6 |
| 7,316,368 B2 | 1/2008 | Moon et al. |
| 8,556,200 B2 | 10/2013 | Piotrowski et al. |
| 8,807,157 B2 | 8/2014 | Simpson et al. |
| 2002/0053625 A1 * | 5/2002 | Charlton ................. B65H 75/22 242/608.5 |
| 2007/0119015 A1 | 5/2007 | Leslie et al. |
| 2007/0209711 A1 | 9/2007 | Morgan et al. |
| 2007/0262192 A1 * | 11/2007 | Derendal ............... B65H 75/14 242/608.5 |
| 2008/0089748 A1 * | 4/2008 | Johnson ................ E04F 21/085 406/136 |
| 2011/0198426 A1 * | 8/2011 | Piotrowski ............ E04F 21/085 241/101.71 |
| 2013/0068866 A1 * | 3/2013 | Conrad ............... B02C 18/0092 241/220 |

* cited by examiner

INSULATION BLOWING MACHINE

RELATED APPLICATIONS

This application claims priority from U.S. Provisional Patent Application No. 62/257,364, filed Nov. 19, 2015, the disclosure of which is incorporated herein by reference in its entirety.

BACKGROUND

When insulating buildings and installations, a frequently used insulation product is loosefill insulation material. In contrast to the unitary or monolithic structure of insulation materials formed as batts or blankets, loosefill insulation material is a multiplicity of discrete, individual tufts, cubes, flakes or nodules. Loosefill insulation material is usually applied within buildings and installations by blowing the loosefill insulation material into an insulation cavity, such as a wall cavity or an attic of a building. Typically loosefill insulation material is made of glass fibers although other mineral fibers, organic fibers, and cellulose fibers can be used.

Loosefill insulation material, also referred to as blowing wool, is typically compressed in packages for transport from an insulation manufacturing site to a building that is to be insulated. Typically the packages include compressed loosefill insulation material encapsulated in a bag. The bags can be made of polypropylene or other suitable material. During the packaging of the loosefill insulation material, it is placed under compression for storage and transportation efficiencies. Typically, the loosefill insulation material is packaged with a compression ratio of at least about 10:1.

The distribution of loosefill insulation material into an insulation cavity typically uses an insulation blowing machine equipped to condition the loosefill insulation material to a desired density and feed the conditioned loosefill insulation material pneumatically through a distribution hose. The distribution hoses can be lengthy and cumbersome when the insulation blowing machine is not in use.

It would be advantageous if insulation blowing machines could be improved to make them easier to use.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the insulation blowing machine.

The above objects as well as other objects not specifically enumerated are achieved by a machine for distributing insulation material from a package of compressed insulation material. The machine includes a chute having an inlet end and outlet end. The inlet end is configured to receive the package of compressed insulation material. The chute further has a removable hose hub configured for wrapping with a distribution hose. The removable hose hub is further configured for engagement with opposing flange assemblies such that rotation of the hose hub results in rotation of the flange assemblies. A lower unit is configured to receive the compressed insulation material exiting the outlet end of the chute. The lower unit includes a plurality of shredders and a discharge mechanism. The discharge mechanism is configured to discharge conditioned insulation material into an airstream.

There is also provided a machine for distributing insulation material from a package of compressed insulation material. The machine includes a chute having an inlet end and outlet end. The inlet end is configured to receive the package of compressed insulation material. A removable hose hub is installed in the chute. A lower unit is configured to receive the compressed insulation material exiting the outlet end of the chute. The lower unit includes a plurality of shredders and a discharge mechanism. The discharge mechanism is configured to discharge conditioned insulation material into an airstream. A step plate is configured to facilitate orienting the machine at an angle relative to a horizontal surface.

There is also provided a machine for distributing insulation material from a package of compressed insulation material. The machine includes a chute having an inlet end and outlet end. The inlet end is configured to receive the package of compressed insulation material. A removable hose hub is installed in the chute. A lower unit is configured to receive the compressed insulation material exiting the outlet end of the chute. The lower unit includes a plurality of shredders and a discharge mechanism. The discharge mechanism is configured to discharge conditioned insulation material into an airstream. A plurality of grip structures is configured to ease transport of the lower unit.

Various objects and advantages of the insulation blowing machine will become apparent to those skilled in the art from the following detailed description, when read in light of the accompanying drawings.

DETAILED DESCRIPTION

Figure 1:
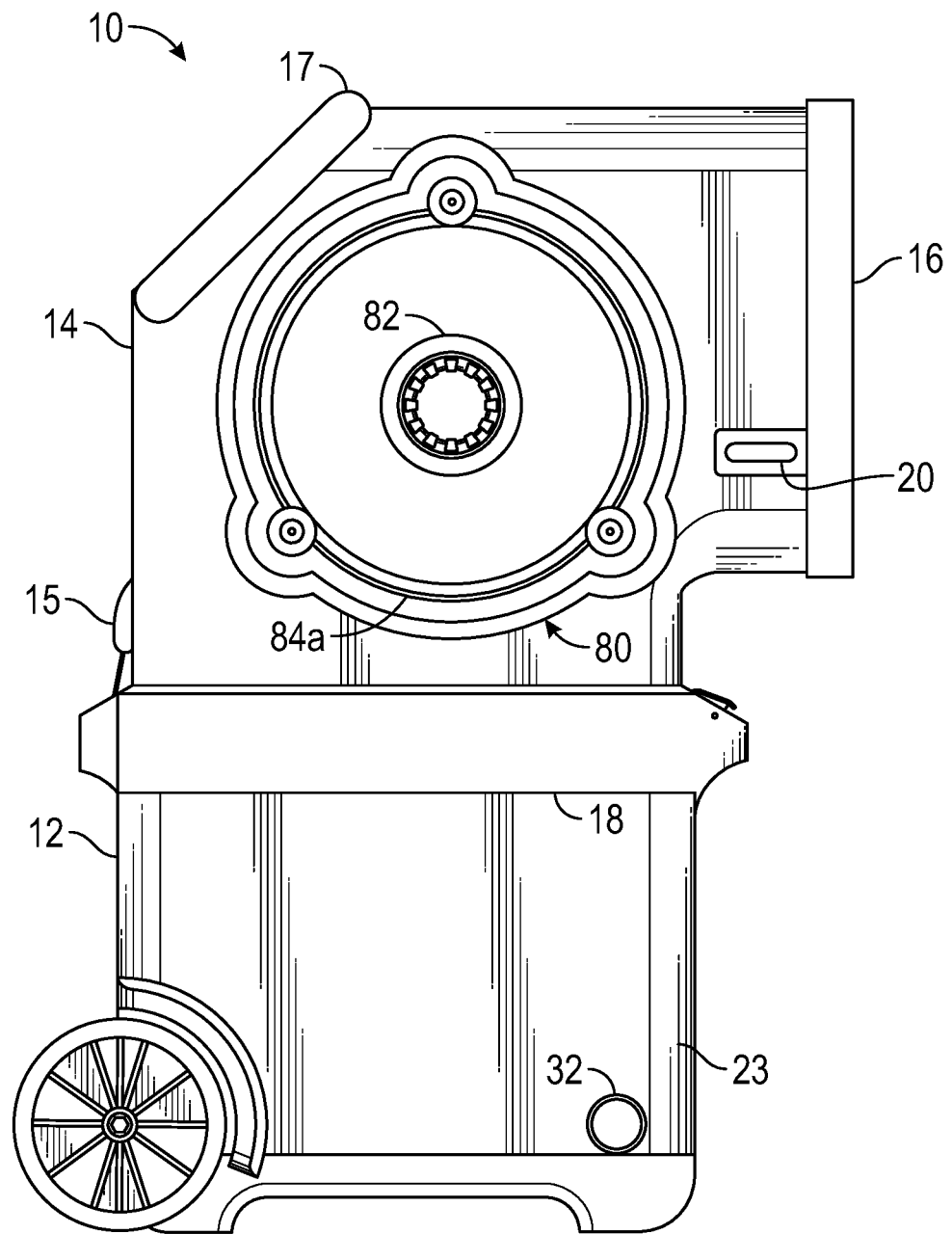
FIG. 1 is a front view, in elevation, of an insulation blowing machine.

The insulation blowing machine will now be described with occasional reference to specific embodiments. The insulation blowing machine may, however, be embodied in different forms and should not be construed as limited to the embodiments set forth herein. Rather, these embodiments are provided so that this disclosure will be thorough and complete, and will fully convey the scope of the insulation blowing machine to those skilled in the art.

Unless otherwise defined, all technical and scientific terms used herein have the same meaning as commonly understood by one of ordinary skill in the art to which the insulation blowing machine belongs. The terminology used in the description of the insulation blowing machine herein is for describing particular embodiments only and is not intended to be limiting of the insulation blowing machine. As used in the description of the insulation blowing machine and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the insulation blowing machine. Notwithstanding that the numerical ranges and parameters setting forth the broad scope of the insulation blowing machine are approximations, the numerical values set forth in the specific examples are reported as precisely as possible. Any numerical values, however, inherently contain certain errors necessarily resulting from error found in their respective measurements.

In accordance with illustrated embodiments, the description and figures disclose an insulation blowing machine having a removable hose hub positioned within a chute. The removable hose hub is configured to receive and store a distribution hose within the chute. With the blowing machine in an operational mode, the distribution hose is removed from the chute by unwrapping the hose from the hose hub. The hose hub is subsequently removed from the chute, thereby allowing the chute to receive a package of compressed insulation material for conditioning and in turn, distribution through the distribution hose. With the blowing machine in a storage mode, the hose hub is installed to extend through the chute, thereby allowing wrapping of the distribution hose on the portion of the hose hub positioned within the chute.

The term "insulation material", as used herein, is defined to mean any insulating material configured for distribution in an airstream. The term "finely conditioned", as used herein, is defined to mean the shredding, picking apart and conditioning of insulation material to a desired density prior to distribution into an airstream.

Figure 2:
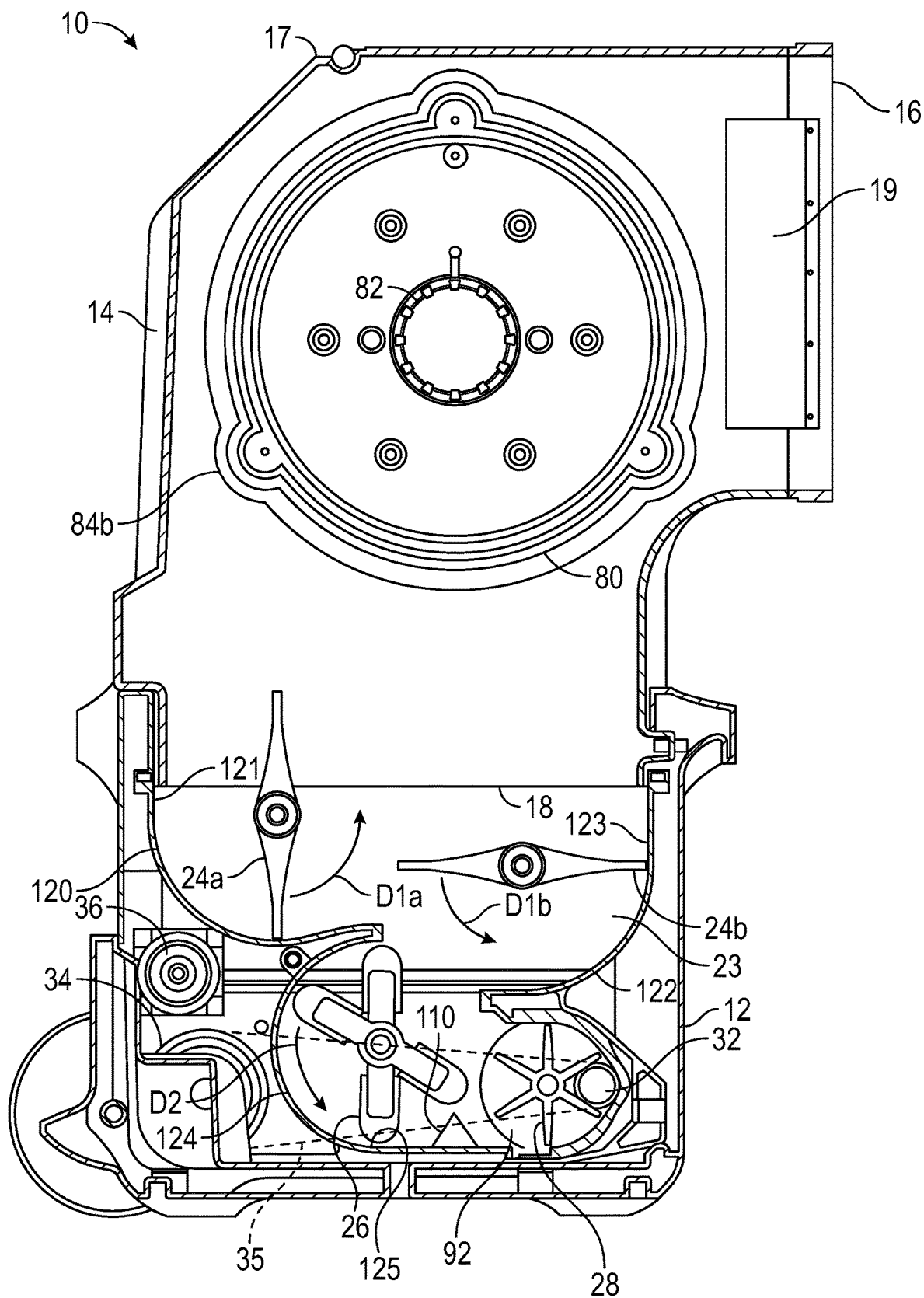
FIG. 2 is a front view, in elevation, partially in cross-section, of the insulation blowing machine of FIG. 1.
Figure 3:
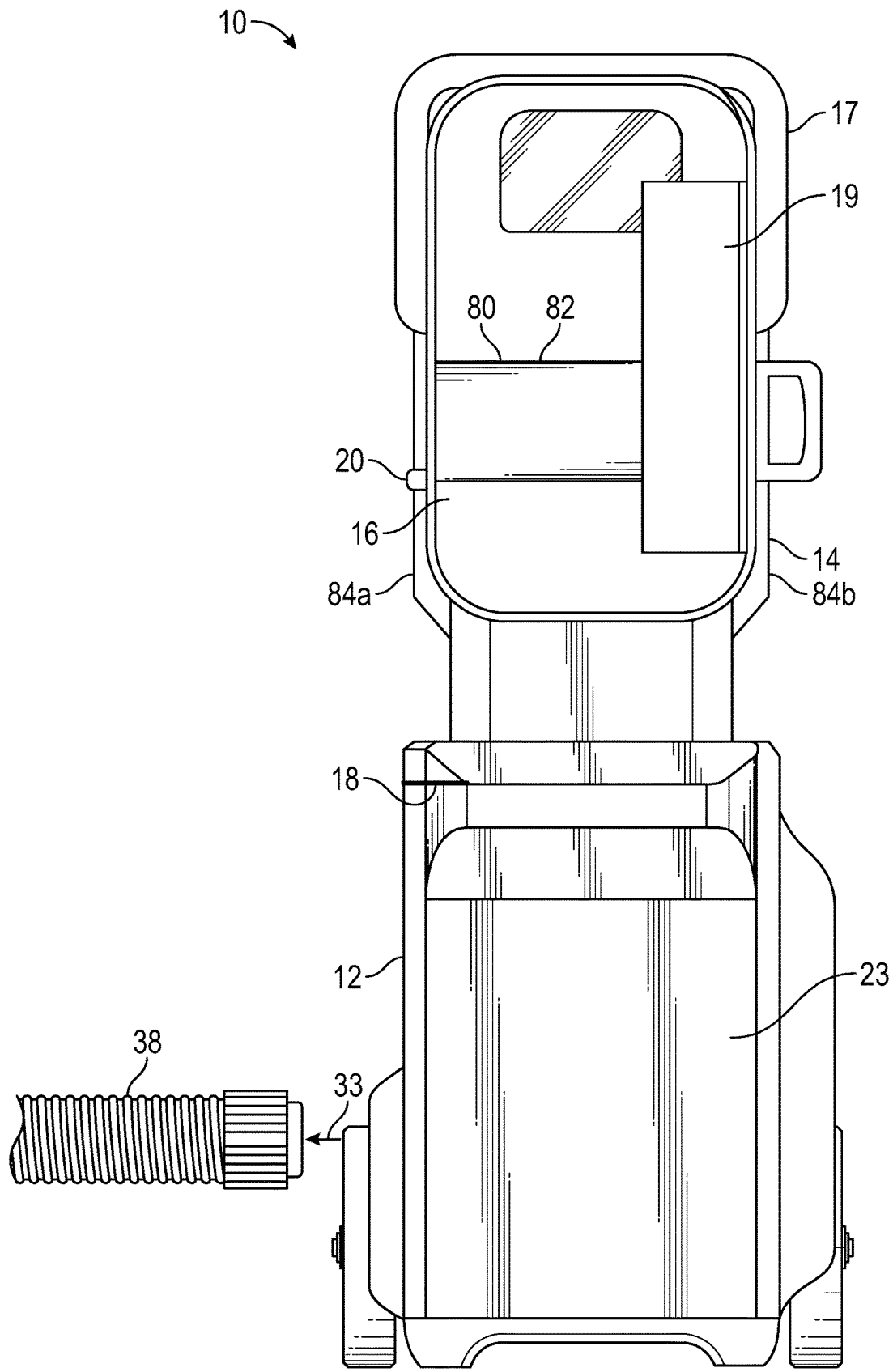
FIG. 3 is a side view, in elevation, of the insulation blowing machine of FIG. 1.

Referring now to FIGS. 1-3, an insulation blowing machine (hereafter "blowing machine") is shown generally at 10. The blowing machine 10 is configured for conditioning compressed insulation material and further configured for distributing the conditioned insulation material to desired locations, such as for example, insulation cavities. In the illustrated embodiment, the compressed insulation material is loosefill insulation material. However, in other embodiments, the compressed insulation material can be other materials, including the non-limiting example of cellulose material. The blowing machine 10 includes a lower unit 12 and a chute 14. The lower unit 12 is connected to the chute 14 by one or more fastening mechanisms 15, configured to readily assemble and disassemble the chute 14 to the lower unit 12. The chute 14 has an inlet end 16 and an outlet end 18.

Referring again to FIGS. 1-3, the inlet end 16 of the chute 14 is configured to receive compressed insulation material typically contained within a package (not shown for purposes of clarity). In certain embodiments, the compressed insulation material can be loosefill insulation material. However, in other embodiments, the compressed insulation material can have other forms. As the package of compressed insulation material is guided into an interior of the chute 14, the cross-sectional shape and size of the chute 14 relative to the cross-sectional shape and size of the package of compressed insulation material directs an expansion of the compressed insulation material to a direction toward the outlet end 18, wherein the insulation material is introduced to a shredding chamber 23 positioned in the lower unit 12.

Referring again to FIGS. 1-3, optionally the chute 14 can include one or more handle segments 17, configured to facilitate ready movement of the blowing machine 10 from one location to another. The handle segment 17 can have any desired structure and configuration. However, it should be understood that the one or more handle segments 17 are not necessary to the operation of the blowing machine 10.

Referring again to FIGS. 1-3, the chute 14 includes a bail guide 19, mounted at the inlet end 16 of the chute 14. The bail guide 19 is configured to urge a package of compressed insulation material against a cutting mechanism 20 as the package of compressed loosefill insulation material moves further into the interior of the chute 14. The bail guide 19 and the cutting mechanism 20 can have any desired structure.

Referring again to FIGS. 1-3, the chute 14 includes a distribution hose storage assembly 80. The distribution hose storage assembly 80 is configured to store a distribution hose 38 within the chute 14 when the blowing machine 10 is not in use. Portions of the distribution hose storage assembly 80 are further configured for removal from the chute 14 when the blowing machine 10 is in use. The distribution hose storage assembly 80 will be discussed in more detail below.

Referring now to FIG. 2, the shredding chamber 23 is mounted in the lower unit 12, downstream from the outlet end 18 of the chute 14. The shredding chamber 23 can include a plurality of low speed shredders 24a, 24b and one or more agitators 26. The low speed shredders 24a, 24b are configured to shred, pick apart and condition the insulation material as the insulation material is discharged into the shredding chamber 23 from the outlet end 18 of the chute 14. The one or more agitators 26 are configured to finely condition the insulation material to a desired density as the insulation material exits the low speed shredders 24a, 24b. It should be appreciated that any quantity of low speed shredders and agitators can be used. Further, although the blowing machine 10 is described with low speed shredders and agitators, any type or combination of separators, such as clump breakers, beater bars or any other mechanisms, devices or structures that shred, pick apart, condition and/or finely condition the insulation material can be used.

Referring again to the embodiment shown in FIG. 2, the agitator 26 is positioned vertically below the low speed shredders 24a, 24b. Alternatively, the agitator 26 can be positioned in any location relative to the low speed shredders 24a, 24b, such as horizontally adjacent to the low speed shredders 24a, 24b, sufficient to finely condition the insulation material to a desired density as the insulation material exits the low speed shredders 24a, 24b.

In the embodiment illustrated in FIG. 2, the low speed shredders 24a, 24b rotate in a counter-clockwise direction, as shown by direction arrows D1a, D1b and the one or more agitators 26 also rotate in a counter-clockwise direction, as shown by direction arrow D2. Rotating the low speed shredders 24a, 24b and the agitator 26 in the same counter-clockwise directions, D1a, D1b and D2, allows the low speed shredders 24a, 24b and the agitator 26 to shred and pick apart the insulation material while substantially preventing an accumulation of unshredded or partially shredded insulation material in the shredding chamber 23. However, in other embodiments, the low speed shredders 24a, 24b and the agitator 26 could rotate in a clock-wise direction or the low speed shredders 24a, 24b and the agitator 26 could rotate in different directions provided an accumulation of unshredded or partially shredded insulation material does not occur in the shredding chamber 23.

Referring again to the embodiment shown in FIG. 2, the low speed shredders 24a, 24b rotate at a lower rotational speed than the agitator 26. The low speed shredders 24a, 24b rotate at a speed of about 40-80 revolutions per minute (rpm) and the agitator 26 rotates at a speed of about 300-500 rpm. In another embodiment, the low speed shredders 24a, 24b can rotate at a speed less than about 40-80 rpm, provided the speed is sufficient to shred and pick apart the insulation material. In still other embodiments, the agitator 26 can rotate at a speed less than or more than 300-500 rpm provided the speed is sufficient to finely shred the insulation material and prepare the insulation material for distribution into an airstream.

Referring again to FIG. 2, the shredding chamber 23 includes a first guide shell 120 positioned partially around the low speed shredder 24a. The first guide shell 120 extends to form an arc of approximately 90°. The first guide shell 120 has an inner surface 121. The first guide shell 120 is configured to allow the low speed shredder 24a to seal against the inner surface 121 and thereby direct the insulation material in a downstream direction as the low speed shredder 24a rotates.

Referring again to FIG. 2, the shredding chamber 23 includes a second guide shell 122 positioned partially around the low speed shredder 24b. The second guide shell 122 extends to form an arc of approximately 90°. The second guide shell 122 has an inner surface 123. The second guide shell 122 is configured to allow the low speed shredder 24b to seal against the inner surface 123 and thereby direct the insulation material in a downstream direction as the low speed shredder 24b rotates.

Referring again to FIG. 2, the shredding chamber 23 includes a third guide shell 124 positioned partially around the agitator 26. The third guide shell 124 extends to form an approximate semi-circle. The third guide shell 124 has an inner surface 125. The third guide shell 124 is configured to allow the agitator 26 to seal against the inner surface 125 and thereby direct the finely conditioned insulation material in a downstream direction as the agitator 26 rotates.

In the embodiment shown in FIG. 2, the inner surfaces 121, 123 and 125, are formed from a high density polyethylene material (hdpe) configured to provide a lightweight, low friction sealing surface and guide for the loosefill insulation material. Alternatively, the inner surfaces 121, 123 and 125 can be formed from other materials, such as aluminum, sufficient to provide a lightweight, low friction sealing surface and guide that allows the low speed shredders 24a, 24b and the agitator 26 to direct the insulation material is a downstream direction.

Referring again to FIG. 2, a discharge mechanism, shown schematically at 28, is positioned downstream from the one or more agitators 26 and is configured to distribute the finely conditioned insulation material exiting the agitator 26 into an airstream, shown schematically by arrow 33 in FIG. 3. In the illustrated embodiment, the discharge mechanism 28 is a rotary valve. In other embodiments, the discharge mechanism 28 can be other structures, mechanisms and devices, such as for example staging hoppers, metering devices or rotary feeders, sufficient to distribute the finely conditioned insulation material into the airstream 33.

Referring again to FIG. 2, the finely conditioned insulation material is driven through the discharge mechanism 28 and through a machine outlet 32 by the airstream 33. The airstream 33 is provided by a blower 34 and associated ductwork, shown in phantom at 35. In alternate embodiments, the airstream 33 can be provided by other structures and manners, such as by a vacuum, sufficient to provide the airstream 33 through the discharge mechanism 28.

Referring again to FIG. 2, the low speed shredders 24a, 24b, agitator 26 and discharge mechanism 28 are mounted for rotation. In the illustrated embodiment, they are driven by an electric motor 36 and associated drive means (not shown). However, in other embodiments, the low speed shredders 24a, 24b, agitator 26 and discharge mechanism 28 can be driven by any suitable means. In still other embodiments, each of the low speed shredders 24a, 24b, agitator 26 and discharge mechanism 28 can be provided with its own source of rotation. In the illustrated embodiment, the electric motor 36 driving the low speed shredders 24a, 24b, agitator 26 and discharge mechanism 28 is configured to operate on a single 15 ampere, 110 volt a.c. electrical power supply. In other embodiments, other suitable power supplies can be used.

Referring again to FIG. 2, the discharge mechanism 28 is configured with a side inlet 92. The side inlet 92 is configured to receive the finely conditioned insulation material as it is fed in a substantially horizontal direction from the agitator 26. In the illustrated embodiment, the side inlet 92 of the discharge mechanism 28 is positioned to be horizontally adjacent to the agitator 26. In other embodiments, a low speed shredder 24a or 24b, or a plurality of low speed shredders 24a, 24b or agitators 26, or other shredding mechanisms can be positioned horizontally adjacent to the side inlet 92 of the discharge mechanism 28 or in other suitable positions.

Referring again to FIG. 2, a choke 110 is positioned between the agitator 26 and the discharge mechanism 28. In this position, the choke 110 is configured to allow finely conditioned insulation material to enter the side inlet 92 of the discharge mechanism 28 and redirect heavier clumps of conditioned insulation material past the side inlet 92 of the discharge mechanism 28 and back to the low speed shredders, 24a and 24b, for further conditioning. In the illustrated embodiment, the choke 110 has a substantially triangular cross-sectional shape. However, the choke 110 can have other cross-sectional shapes sufficient to allow finely conditioned insulation material to enter the side inlet 92 of the discharge mechanism 28 and redirect heavier clumps of conditioned insulation material past the side inlet 92 of the discharge mechanism 28 and back to the low speed shredders, 24a and 24b, for further conditioning.

Referring again to FIG. 2, in operation, the inlet end 16 of the chute 14 receives a package of compressed insulation material. As the package of compressed insulation material moves into the chute 14, the bale guide 19 urges the package against the cutting mechanism 20, thereby cutting an outer protective covering and allowing the compressed insulation within the package to expand. As the compressed insulation material expands within the chute 14, the chute 14 directs the expanding insulation material past the outlet end 18 of the chute 14 and into the shredding chamber 23. The low speed shredders 24a, 24b receive the insulation material and shred, pick apart and condition the insulation material. The insulation material is directed by the low speed shredders 24a, 24b to the agitator 26. The agitator 26 is configured to finely condition the insulation material and prepare the insulation material for distribution into the airstream 33 by further shredding and conditioning the insulation material. The finely conditioned insulation material exits the agitator 26 and enters the discharge mechanism 28 for distribution into the airstream 33 provided by the blower 34. The airstream 33, entrained with the finely conditioned insulation material, exits the insulation blowing machine 10 at the machine outlet 32 and flows through the distribution hose 38 toward an insulation cavity (not shown).

Figure 4:
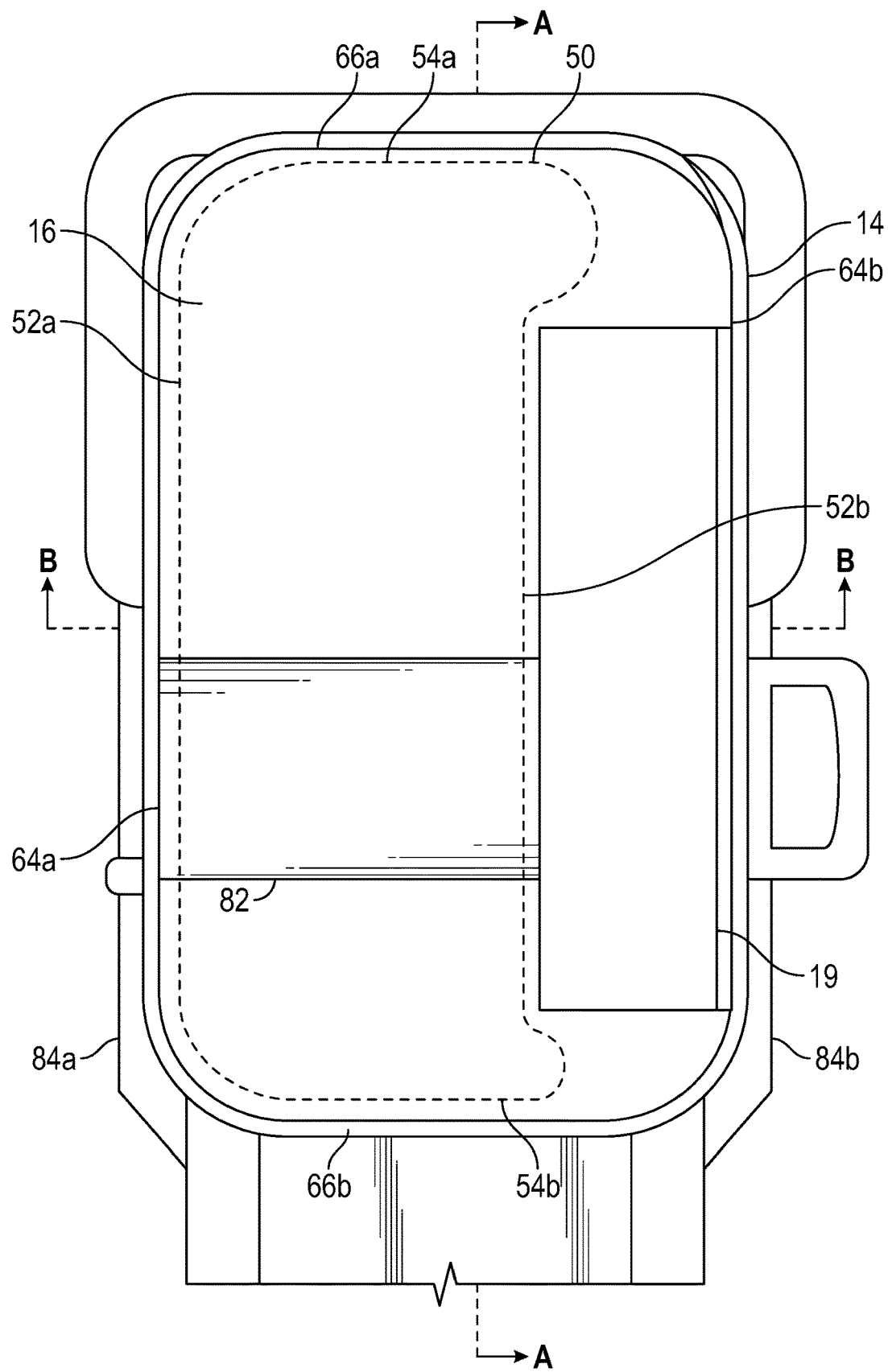
FIG. 4 is a side view, in elevation, of a portion of a chute of the insulation blowing machine of FIG. 1.

Referring now to FIG. 4, the inlet end 16 of the chute 14 includes longitudinal sides 64a, 64b and lateral sides 66a, 66b. The longitudinal sides 64a, 64b of the inlet end 16 of the chute 14, are configured to be substantially vertical and centered about major longitudinal axis A-A. The lateral sides 66a, 66b are configured to be substantially horizontal and centered about major lateral axis B-B. In operation, a package of compressed insulation material (shown schematically in phantom at 50) is fed into the inlet end 16 of the chute 14 in a manner such that the package 50 has a substantially vertical orientation. The term "vertical orientation", as used herein, is defined to mean a major face 52a of the package 50 is adjacent to the longitudinal side 64a, opposing major face 52b is adjacent to the substantially vertical-oriented bale guide 19 and opposing minor faces 54a, 54b of the package 50 are adjacent to the lateral sides 66a, 66b. Alternatively, the chute 14 can be configured such that the package 50 has a substantially horizontal orientation when fed into the inlet end 16 of the chute 14.

Referring again to FIGS. 1-4, as discussed above, the chute 14 includes a distribution hose storage assembly 80. The distribution hose storage assembly 80 is configured to store a distribution hose 38 within the interior spaces of the chute 14 when the blowing machine 10 is not in use. Portions of the distribution hose storage assembly 80 are further configured for removal from the chute 14 when the blowing machine 10 is in use. The distribution hose storage assembly 80 includes a hose hub 82 extending through and attached to opposing flange assemblies 84a, 84b. Flange assembly 84a is rotatably mounted to longitudinal side 64a of the chute 14 and flange assembly 84b is rotatably mounted to longitudinal side 64b of the chute 14.

Figure 5:
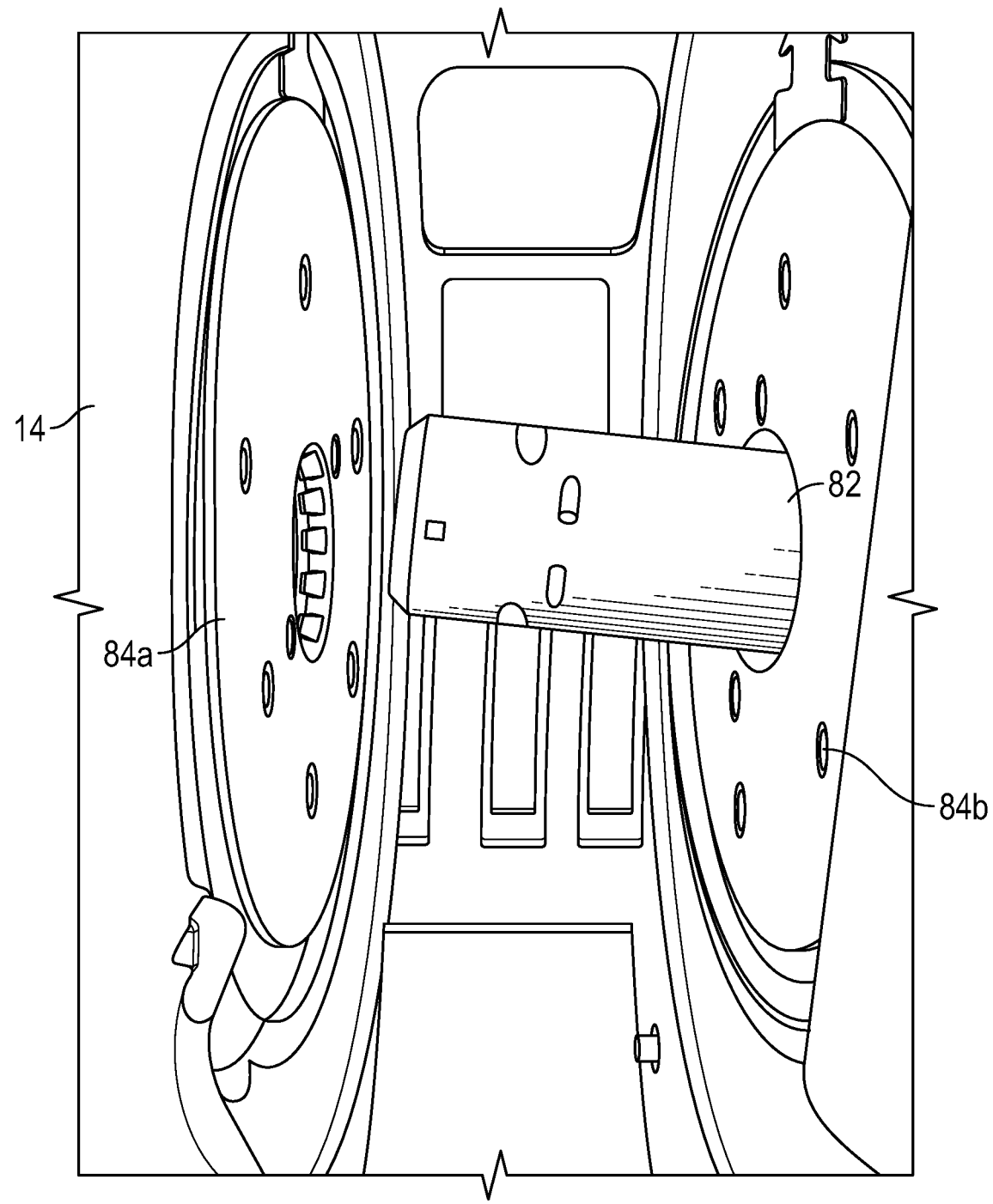
FIG. 5 is a front view, in elevation, of an interior portion of the chute of the insulation blowing machine of FIG. 1.

Referring now to FIG. 5, portions of the chute 14 are illustrated with the hose hub 82 shown extending partially between the opposing flange assemblies 84a, 84b. In an installed position, the hose hub 82 extends through the flange 84b and through the flange 84a. The resulting structure of the hose hub 82 and the opposing flange assemblies 84a, 84b is rotatably mounted within the interior of the chute 14. In the installed position, the hose hub 82 is configured to receive and support accumulated wrappings of the distribution hose 38.

Figure 6:
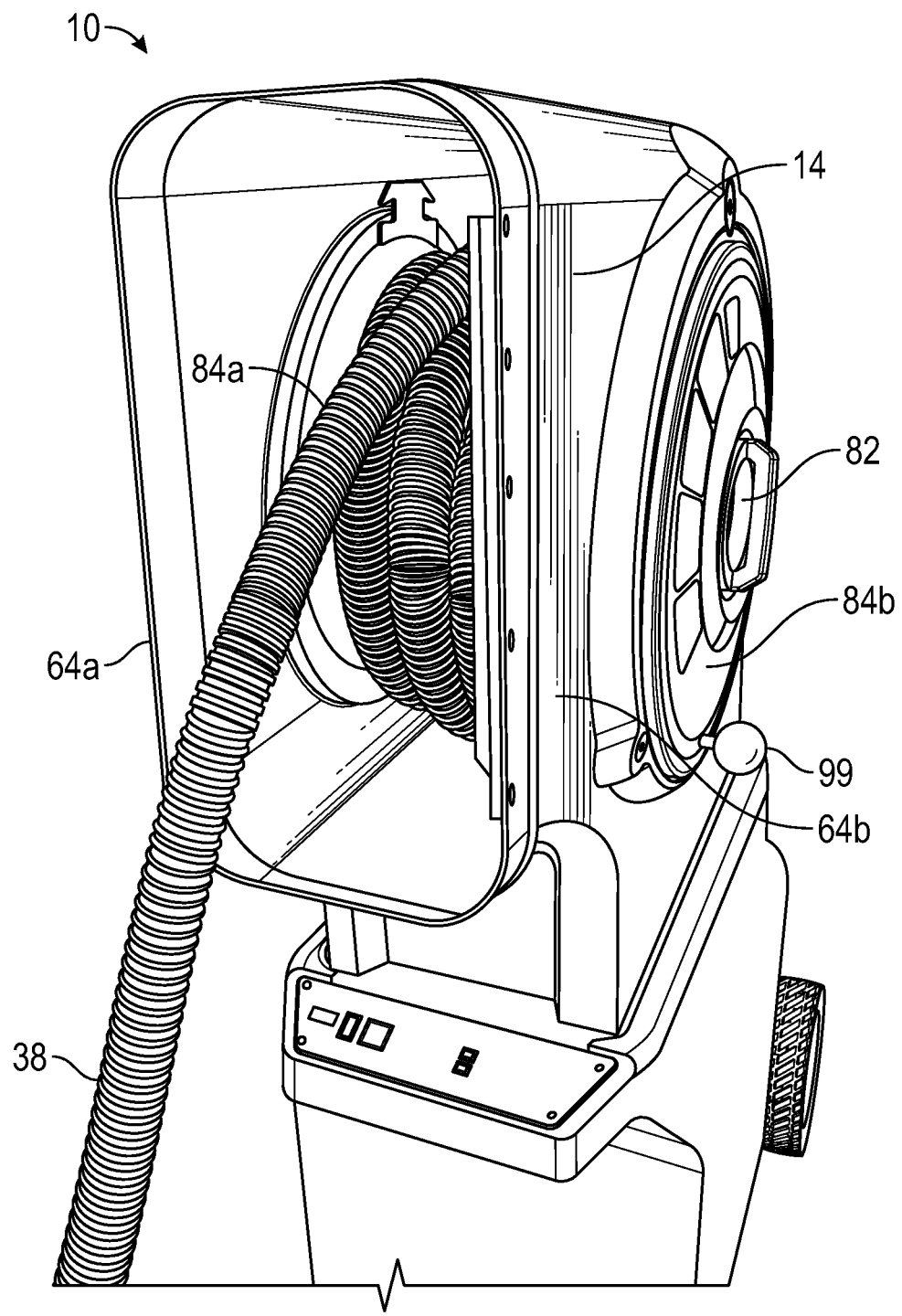
FIG. 6 is a perspective view of the insulation blowing machine of Figure showing a distribution hose wrapped around a hose hub positioned within the chute.

Referring now to FIG. 6, the blowing machine 10 is illustrated with portions of a distribution hose 38 wrapped around the hose hub 82. The hose hub 82 extends through the flange assembly 84b, through the interior of the chute 14 and through the opposing flange assembly 84a. Portions of the flange assemblies 84a, 84b positioned within the interior of the chute 14 are configured to guide the distribution hose 38 onto the hose hub 82 during the wrapping process such that the distribution hose 38 wraps onto the hose hub 82 without extending into other portions of the chute 14.

Figure 7A:
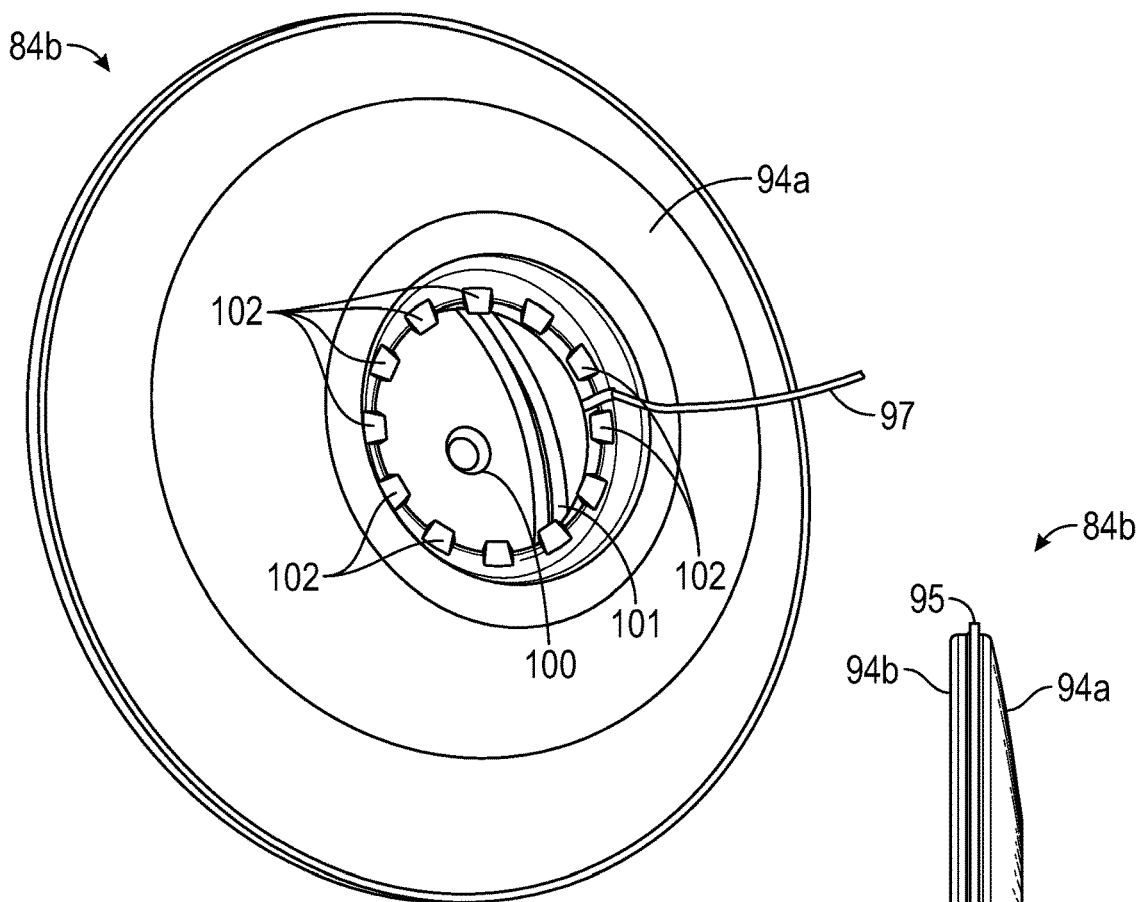
FIG. 7A is a perspective view of a flange assembly of the insulation blowing machine of FIG. 1.
Figure 7C:
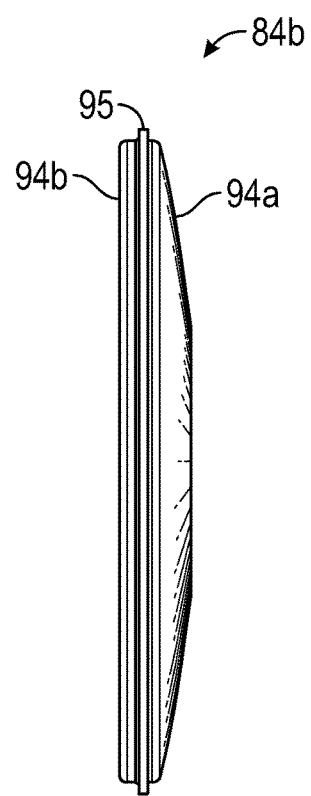
FIG. 7C is a side view of a flange assembly of FIG. 7A.
Figure 7B:
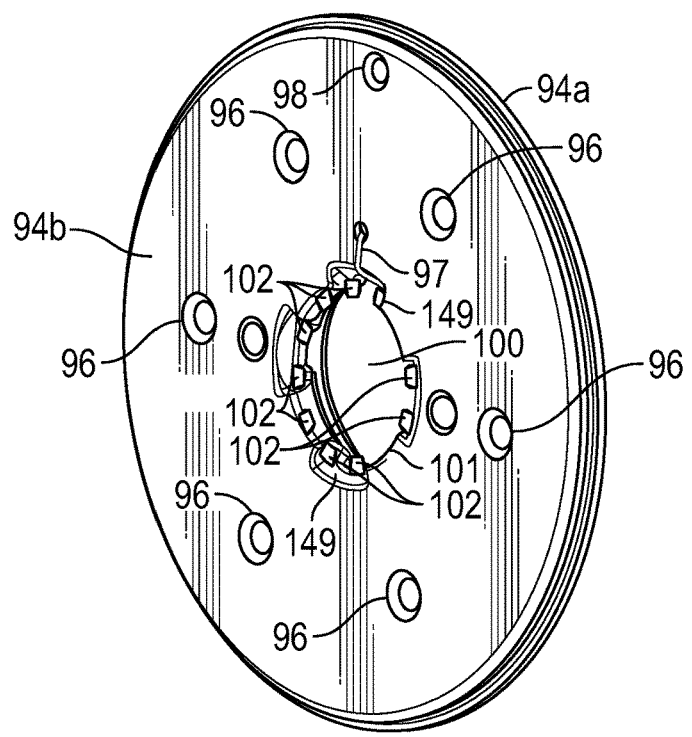
FIG. 7B is another perspective view of a flange assembly of FIG. 7A.

Referring now to FIGS. 7A, 7B and 7C, the flange assembly 84b is illustrated. Flange assembly 84b is representative of the flange assembly 84a. Flange assembly 84b includes an outer disk-shaped segment 94a connected to an inner disk-shaped segment 94b. The connected segments 94a, 94b cooperate such that the flange assembly 84b can be rotatably mounted within a corresponding aperture (not shown) in the longitudinal side 64b of the chute 14. In a similar manner, the connected segments forming flange assembly 84a cooperate such that the flange assembly 84a can be rotatably mounted within a corresponding aperture (not shown) in the longitudinal side 64a of the chute 14. In the illustrated embodiment, the inner disk-shaped segment 94b is connected to the outer disk-shaped segment 94b with fasteners (not shown) extending through apertures 96 located in the inner disk-shaped segment 94b. However, it should be understood that in other embodiments, the outer disk-shaped segment 94a can be connected to the inner disk-shaped segment 94b with other structures, methods and devices, including the non-limiting examples of clips and clamps.

Referring now to FIG. 7B, a projection aperture 98 extends through the outer and inner segments 94a, 94b and is configured to receive a projection 99, as shown in FIG. 6, extending in an outward direction from the outer segment 94a. The projection 99 will be discussed in more detail below.

Referring again to FIGS. 7A, 7B and 7C, the segments 94a, 94b include an aperture 100 extending there through. The aperture 100 is defined by a circumferential rim 101. The circumferential rim 101 includes a plurality of spaced apart cogs 102 configured to extend into the aperture 100. The spaced apart cogs 102 will be discussed in more detail below.

Figure 9A:
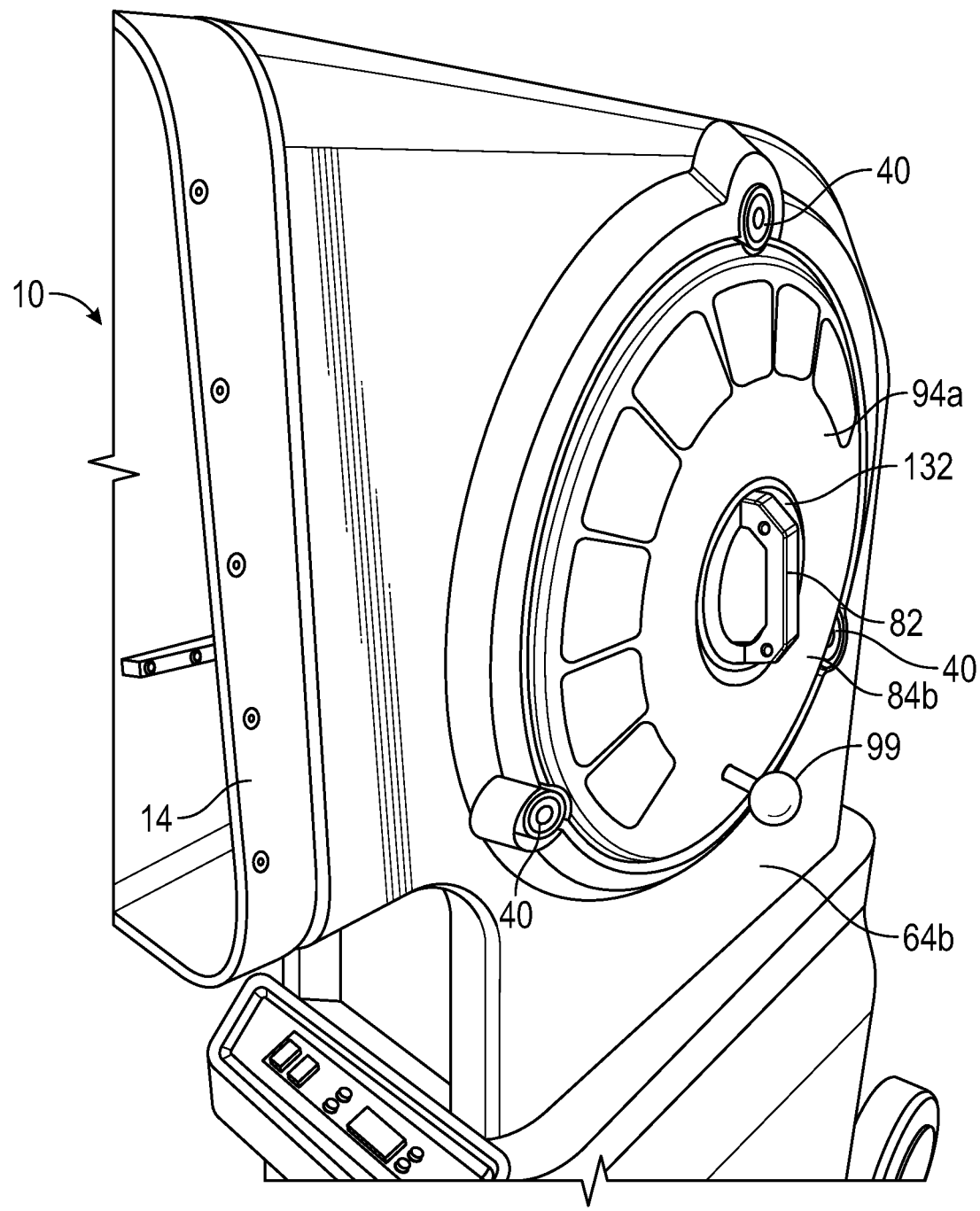
FIG. 9A is a perspective view of the hose hub and flange assembly of FIG. 5.
Figure 9B:
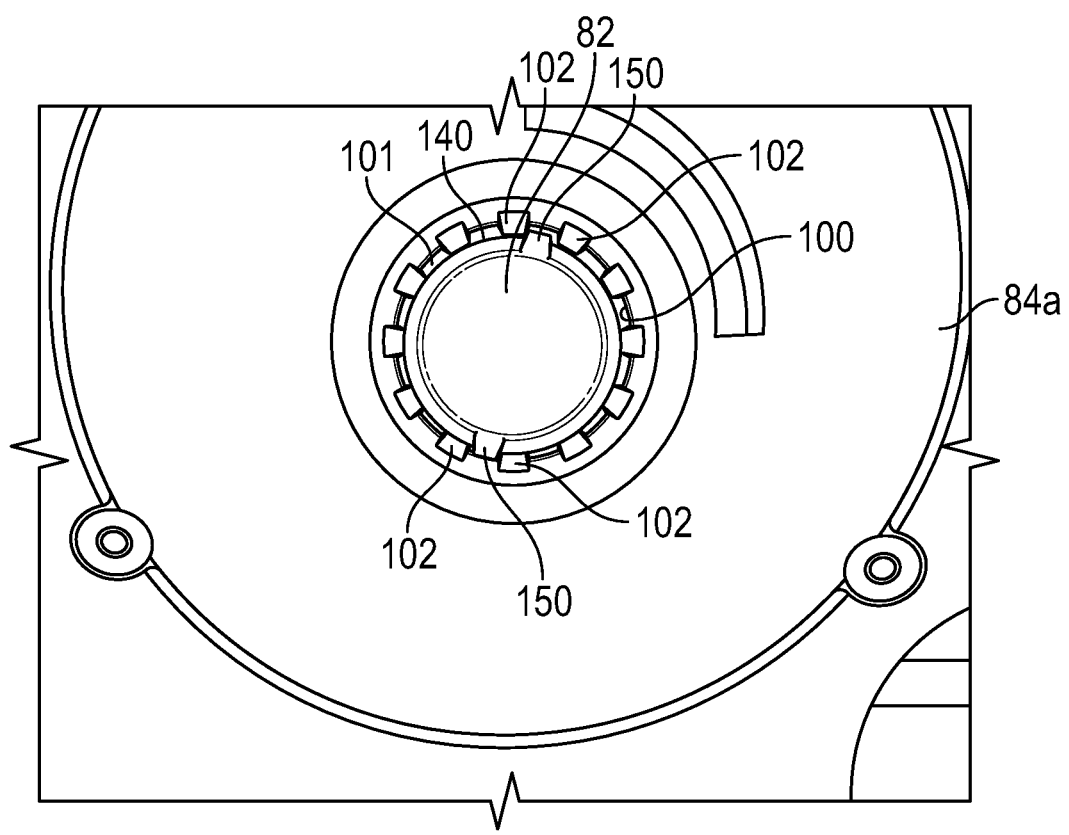
FIG. 9B is a front view of a first end of the hose hub shown in a seated orientation with the flange assembly of the insulation blowing machine of FIG. 1.
Figure 9C:
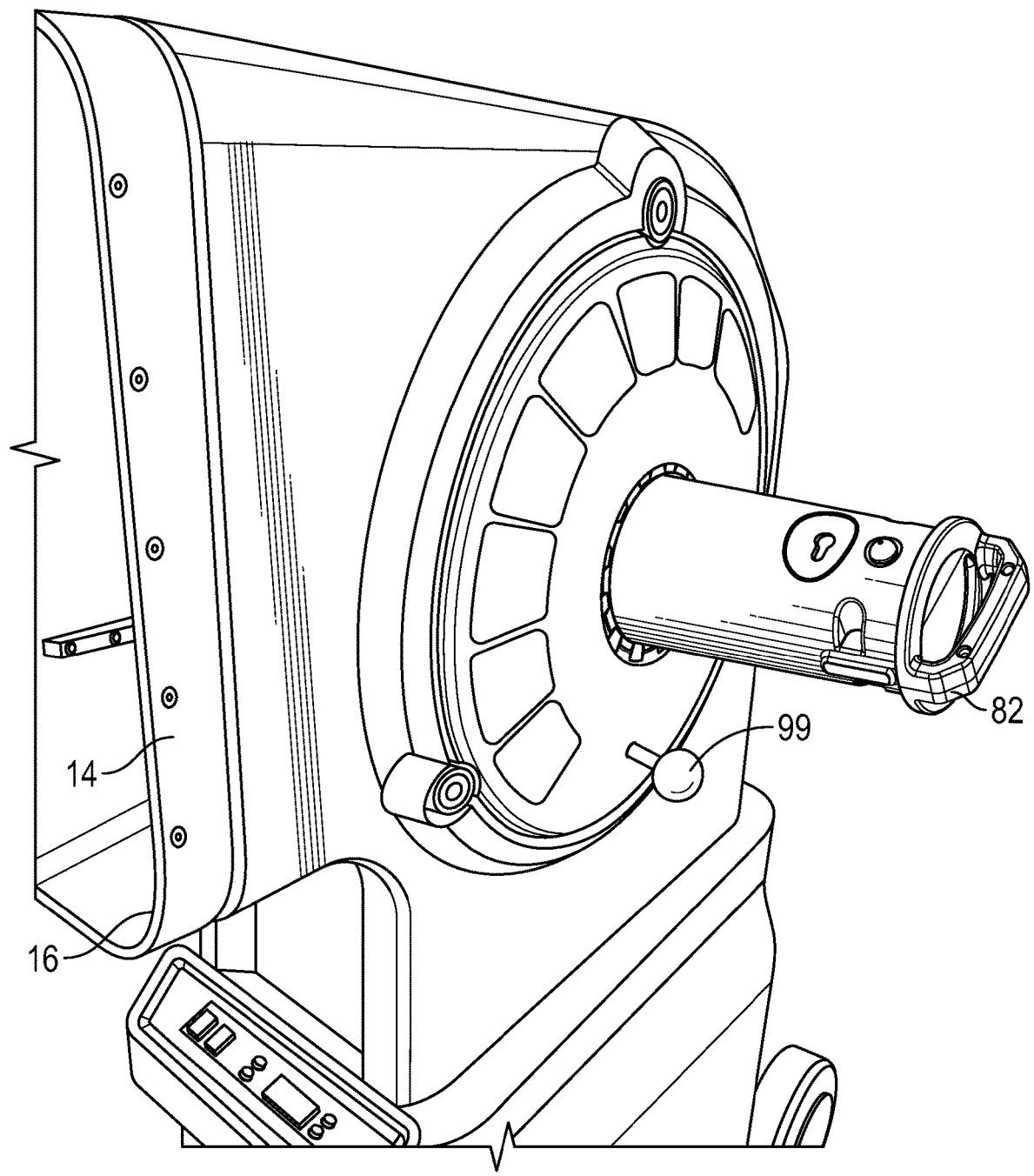
FIG. 9C is a perspective view of the insulation blowing machine of FIG. 1 illustrating the removal of the hose hub from the flange assembly.
Figure 9D:
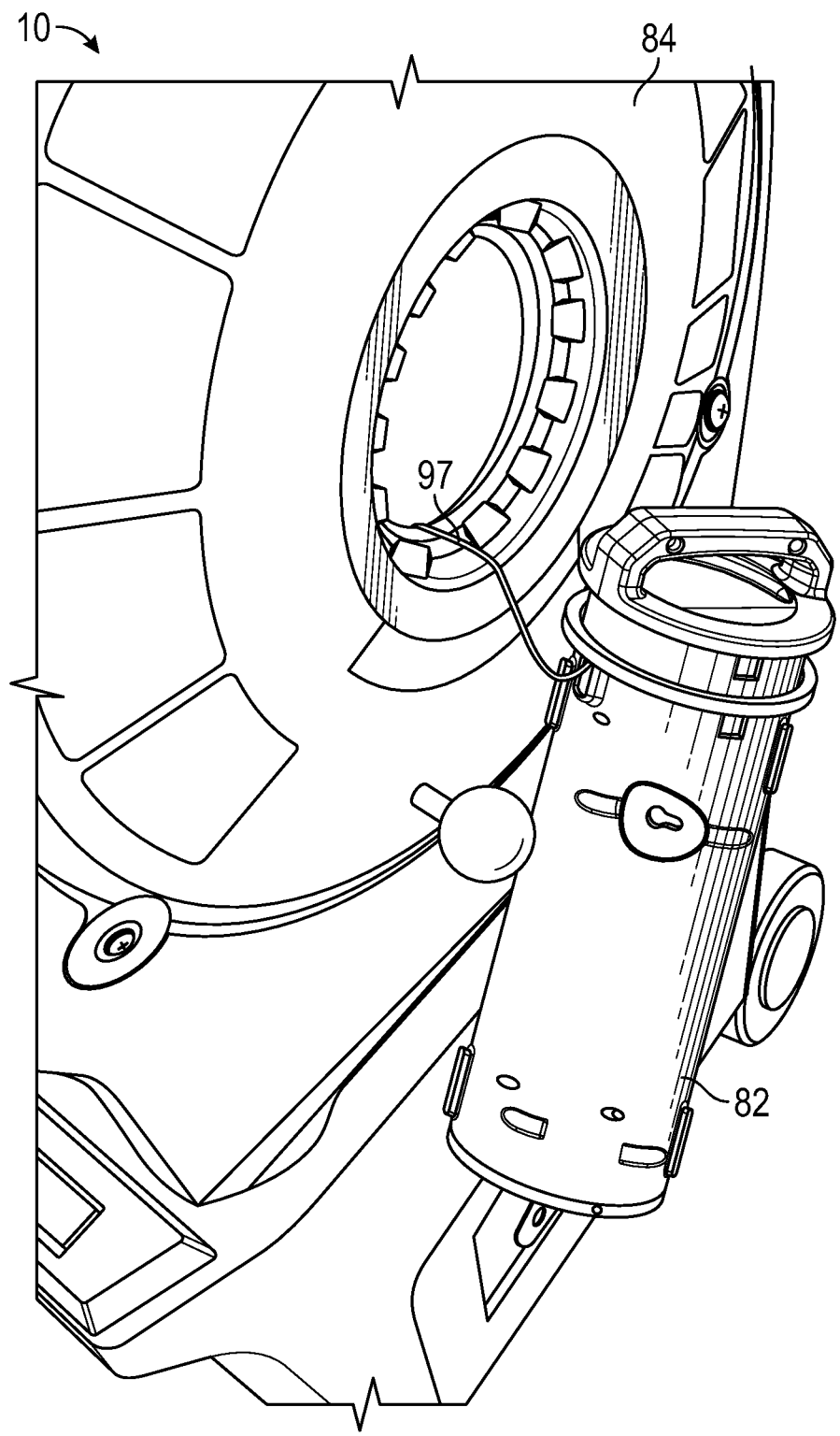
FIG. 9D is a perspective view of the insulation blowing machine of FIG. 1 illustrating a tether connecting the hose hub to the insulation blowing machine after the hose hub has been removed from the flange assembly.

Referring now to FIGS. 7A, and 9D, a tether 97 is configured to connect the hose hub 82 to the flange assembly 84b. As shown in FIG. 9D, the tether 97 is configured to maintain the connection between the hose hub 82 and the flange assembly 84b when the hose hub 82 is removed from the blowing machine 10 in an operational mode. As further shown by FIG. 9D, the tether 97 is configured to allow the hose hub 82 to freely hang at the side of the blowing machine 10.

Referring again to FIGS. 7A and 9D, a first end of the tether 97 is connected to the inner disk-shaped segment 94b of the flange assembly 84b. The tether 97 extends through the aperture 100. A second end of the tether 97 extends into and is connected to an internal portion of the hose hub 82.

In the embodiment illustrated in FIGS. 7A and 9D, the tether 97 has the form of an elastic member, such as the non-limiting example of a bungy-style cord. However, it should be appreciated that in other embodiments, the tether 97 can have other forms, such as for example, paracord.

Figure 8:
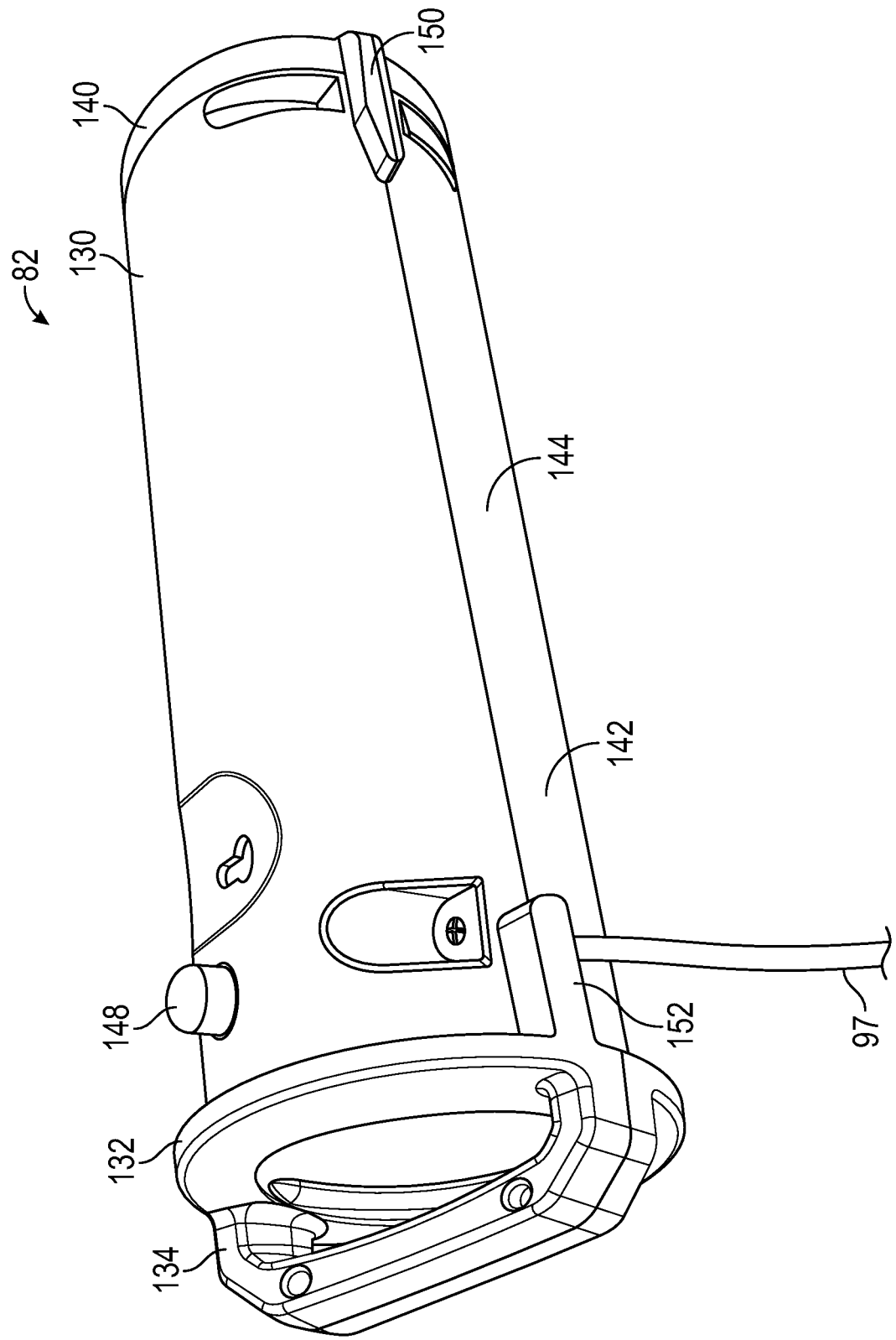
FIG. 8 is a perspective view of a hose hub of the insulation blowing machine of FIG. 1.

Referring now to FIG. 8, the hose hub 82 is illustrated. The hose hub 82 includes a body 130, a rim 132 and a hub handle 134. The body 130 includes a first end 140, a second end 142 and an intermediate section 144 extending therebetween. The hose hub 82 is configured such that in an installed position within the interior spaces of the chute 14, the first end 140 seats with the flange assembly 84a, the second end seats with the flange assembly 84b and the interim section 144 is exposed within the interior spaces of the chute 14.

Referring again to FIG. 8, the body 130 has a circular cross-sectional shape configured to receive and support accumulated wrappings of the distribution hose 38. However, it should be appreciated that in other embodiments, the body 130 can have other cross-sectional shapes sufficient to receive and support accumulated wrappings of the distribution hose 38.

Referring again to FIG. 8, the body 130 includes one or more spaced apart projections 148 (a single projection 148 is shown in FIG. 8 for purposes of clarity). The projections 148 are configured for seating within opposing recesses 149 of the inner disk-shaped segment 94b of the flange assembly 84b, when the hose hub 82 is in an installed position. In the illustrated embodiment, the projections 148 include spring-loaded structures configured to assume a depressed arrangement upon insertion into the flange assembly 84b. The projections 148 are configured to return to an extended arrangement after the projections 148 extend through the flange assembly 84b. Upon seating with the opposing recesses 149 of the flange assembly 84b, the projections 148 operate to connect the hose hub 82 to the flange assembly 84b with a "snap" connection. However, it should be appreciated that in other embodiments, the hose hub 82 can be connected to the flange assembly 84b with other structures, methods and devices, including the non-limiting examples of clips and clamps.

Referring again to FIG. 8, the first end 140 of the hose hub 82 includes a plurality of spaced apart first end lugs 150 and the second end 142 of the hose hub 82 includes a plurality of spaced apart second end lugs 152. The first end lugs 150 are configured for seating between adjacent cogs 102 of the flange assembly 84a when the hose hub 82 is in an installed position. In a similar manner, the second end lugs 152 are configured for seating between the cogs 102 of the flange assembly 84b when the hose hub 82 is in an installed position. In the seated position, the first and second lugs 150, 152 facilitate rotation of the combined structure of the hose hub 82 and flange assemblies 84a, 84b, thereby improving the functionality of the distribution hose storage assembly 80 as the distribution hose 38 is wound around the hose hub 82.

Referring again to FIG. 8, the first and second lugs 150, 152 have a rectangular cross-sectional shape and lengths sufficient to seat between adjacent cogs 102 of the flange assemblies 84a, 84b. In alternate embodiments, the first and second lugs 150, 152 can have other cross-sectional shapes and lengths sufficient to seat between adjacent cogs 102 of the flange assemblies 84a, 84b. It is further within the contemplation of the blowing machine 10 that the cogs 102 and the lugs 150, 152 can have other structures, shapes, lengths and orientations sufficient to ensure engagement in the event of geometric variations to the cogs 102 and the lugs 150, 152 stemming from manufacturing processes or operation under extreme operating and/or temperature conditions.

In the embodiment illustrated in FIG. 8, the first and second lugs 150, 152 are axially aligned such as to provide an ease of insertion into the flange assemblies 84a, 84b. However, in other embodiments, the first and second lugs 150, 152 can have offset alignments, sufficient to provide an ease of insertion into the flange assemblies 84a, 84b.

In the embodiment illustrated in FIG. 8, the first and second lugs 150, 152 are configured for a clearance fit with the cogs 102 of the flange assemblies 84a, 84b. The clearance fit is configured to allow easy insertion and removal of the hose hub 82 under stress conditions, such as for operation under extreme temperature conditions.

Referring again to FIG. 8, the rim 132 extends radially from the second end 142 of the body 130 and is configured to seat against the outer disk-shaped segment 94a of the flange assembly 84b. When seated, the rim 132 fixes the axial depth of the insertion of the hose hub 82 into the chute 14. The rim 132 can have any desired diameter and configuration sufficient to seat against the outer disk-shaped segment 94a of the flange assembly 84b and fix the axial depth of the insertion of the hose hub 82 into the chute 14.

Referring again to FIG. 8, the hub handle 134 is configured to facilitate ready insertion and removal of the hose hub 82 from the chute 14. The hub handle 134 can have any desired structure and configuration sufficient to facilitate ready insertion and removal of the hose hub 82 from the chute 14.

Referring now to FIG. 9A, the blowing machine 10 is shown in a storage mode. In the storage mode, the rim 132 of the hose hub 82 is seated against the outer disk-shaped segment 94a of the flange assembly 84b and the hose hub 82 extends through the interior of the chute 14 and through the opposing flange assembly (not shown). The distribution hose 38 is wrapped around the hose hub 82, as shown in FIG. 6 and described above.

Referring again to FIG. 9A, flange assembly 84b is configured to rotate on a plurality of spaced apart roller assemblies 40. While not shown in FIG. 9A, flange assembly 84a is also configured to rotate on a plurality of roller assemblies 40. The roller assemblies 40 are positioned in the longitudinal sides 64a, 64b of the chute 14 and are configured to support the flange assemblies 84a, 84b as the flange assemblies 84, 84b rotate during the wrapping of the distribution hose 38 around the hose hub 82. The roller assemblies 40 can have any desired structure, sufficient to support the flange assemblies 84a, 84b as the flange assemblies 84, 84b rotate during the wrapping of the distribution hose 38 around the hose hub 82.

Referring now to FIG. 9B, the hose hub 82 is shown in an installed position with the first end 140 of the hose hub 82 positioned within the aperture 100 of the flange assembly 84a. In this position, the first end lugs 150 of the hose hub 82 are seated between adjacent cogs 102 of the circumferential rim 101 of the flange assembly 84a. While not illustrated in FIG. 9B, it should be appreciated that with the hose hub 82 in an installed position, the second end lugs 150 of the hose hub 82 are seated between adjacent cogs 102 of the circumferential rim 101 of the flange assembly 84b.

Referring now to FIG. 9C, the blowing machine 10 is shown preparing for an operational mode. When preparing for an operational mode, the hose hub 82 is removed from the chute 14, thereby allowing the inlet end 16 of the chute 14 to readily receive a package of compressed insulation material.

Referring now to FIGS. 6 and 9A, rotational actuation of the flange assemblies 84a, 84b and the hose are hub 82 are accomplished by rotation of the projection 99 extending from flange assembly 84b. In certain instances, the projection 99 can have the form of an attachable handle or a knob. In other instances, the projection 99 can have other desired forms and structures.

Figure 10:
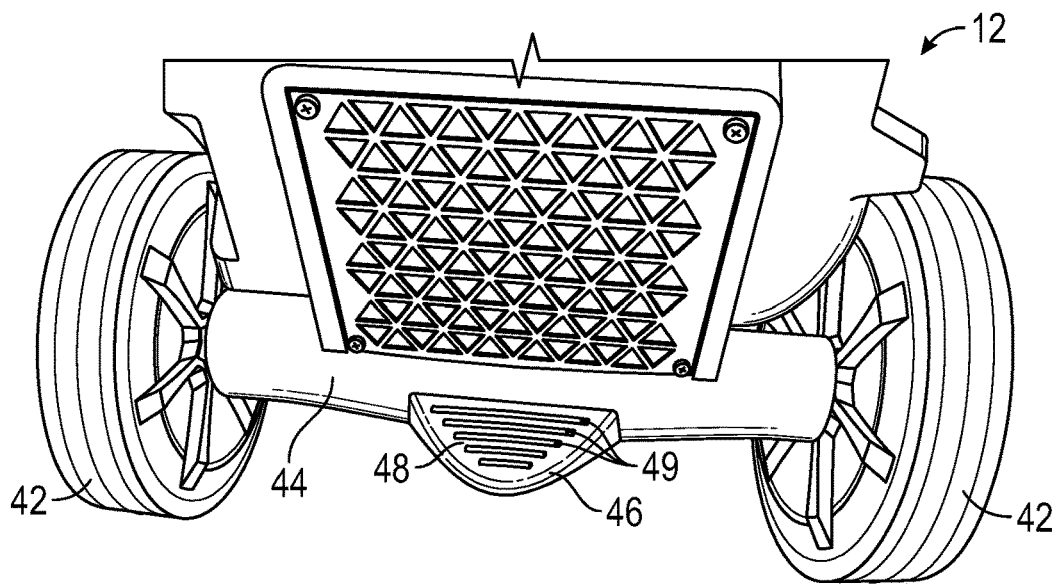
FIG. 10 is a perspective view of a portion of the lower unit of the insulation blowing machine of FIG. 1, illustrating a step plate.

Referring now to FIG. 10, a rear portion of the lower unit 12 is illustrated. The lower unit 12 includes spaced apart wheels 42 supported by an axle (not shown) positioned within an axle housing 44. A step plate 46 is rigidly fixed to the axle housing 44 and extends in a rearward direction away from the lower unit 12. The step plate 46 is configured in a manner such that downward engagement of the step plate 46 by a user's foot and simultaneous engagement of the handle 17 with a user's hand allows easy rotation of the blowing machine 10 about the wheels 42. In the illustrated embodiment, the step plate 46 has a triangular shape sufficient to receive contact with the user's foot. In other embodiments, the step plate 46 can have other shapes sufficient to receive contact with the user's foot. The step plate 46 has an upper surface 48 equipped with a plurality of projections 49. The projections 49 are configured to provide a slip-resistant upper surface 48. In the illustrated embodiment, the projections form a plurality of ridges. However, it should be appreciated that in other embodiments, the projections 49 can formed with other structures, sufficient to provide a slip resistant upper surface 48.

Referring again to the embodiment shown in FIG. 10, the step plate 46 is formed integral to the axle housing 44 such that the step plate 46 and the axle housing 44 form a one-piece structure. In other embodiments, the step plate 46 and the axle housing 44 can be formed as discrete structures that are assembled together. In still other embodiments, the step plate 46 can be hingedly attached to the axle housing 44 such that when not in use, the step plate 46 can be rotated to an inconspicuous orientation. In still other embodiments, the step plate can be attached to the blowing machine 10 at other locations sufficient to facilitate rolling transport of the blowing machine 10.

Figure 11:
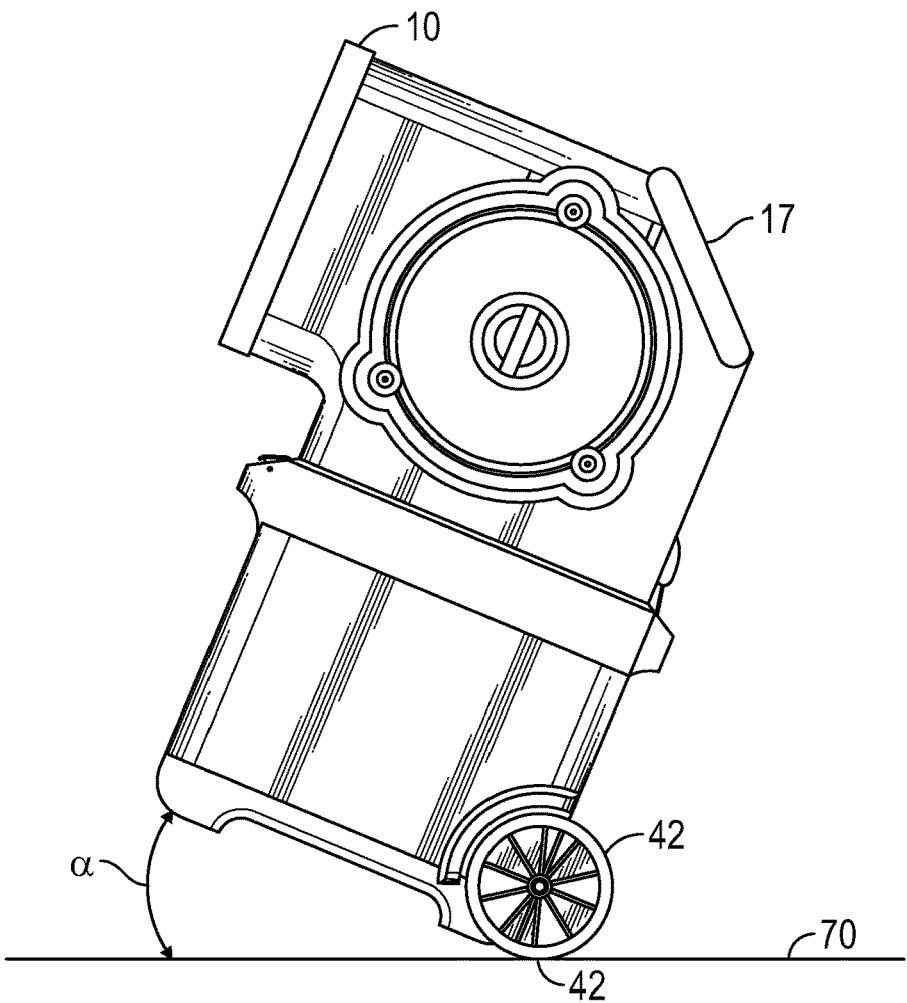
FIG. 11 is a side view of the insulation blowing machine of FIG. 1, illustrating the insulation blowing machine assuming an angle relative to a horizontal surface.

Referring now to FIG. 11, in operation simultaneous engagement of the step plate (not shown) and the handle 17 facilitates easy rotation of the blowing machine 10 about the wheels 42. In this manner, the blowing machine 10 can assume a desired angle α relative to a horizontal surface 70, sufficient to facilitate rolling transport of the blowing machine 10. In the illustrated embodiment, the angle α is in a range of from about 10° to about 25°. In other embodiments, the angle α can be less than about 10° or more than about 25°, sufficient to facilitate rolling transport of the blowing machine 10.

Figure 12:
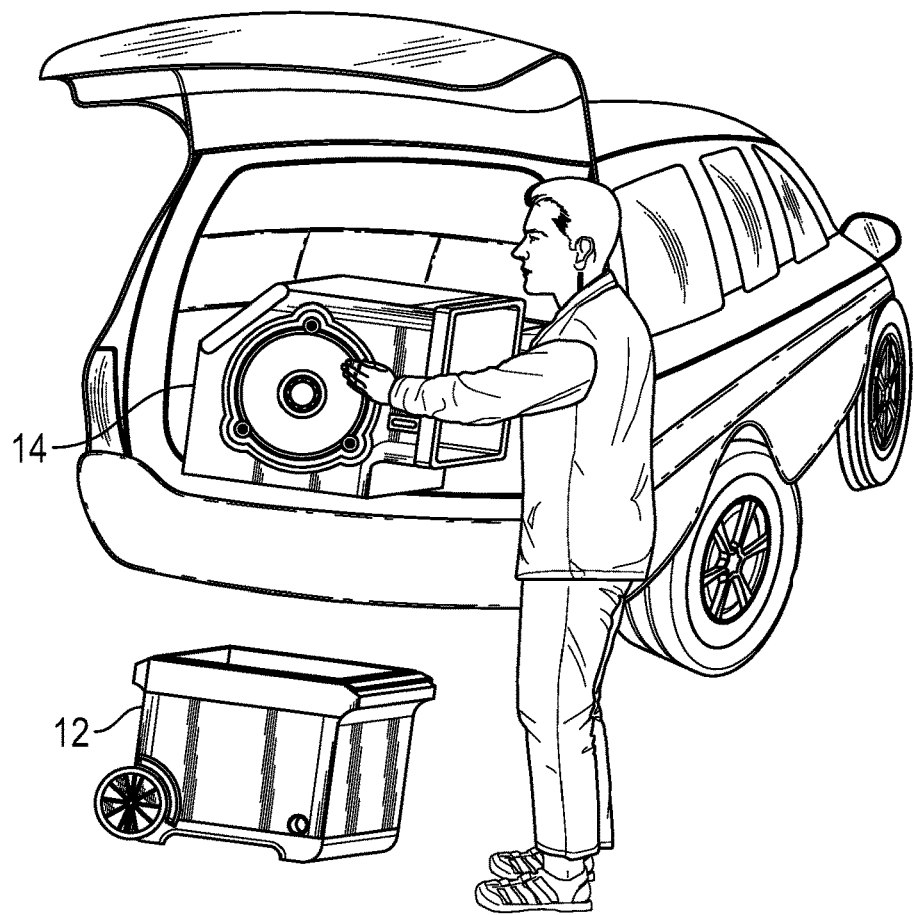
FIG. 12 is a perspective view of the insulation blowing machine of FIG. 1, illustrating the lower unit and the chute as discrete assemblies.

Referring now to FIG. 12 and as noted above, the blowing machine 10 includes a lower unit 12 and a chute 14. The lower unit 12 and the chute 14 are configured for ready assembly and disassembly from each other for ease of transport in a vehicle.

Figure 13:
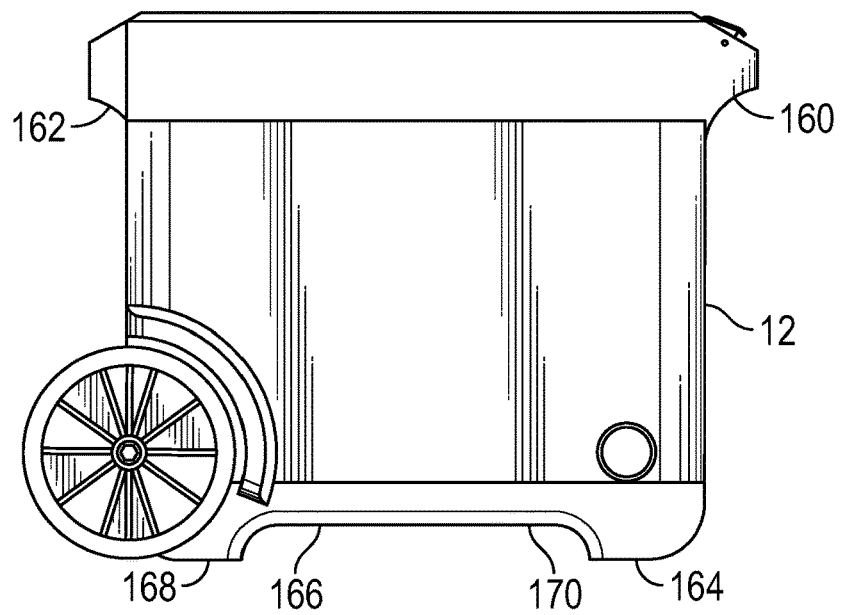
FIG. 13 is a side view of the lower unit of the insulation blowing machine of FIG. 1, illustrating the placement of grip structures.
Figure 14:
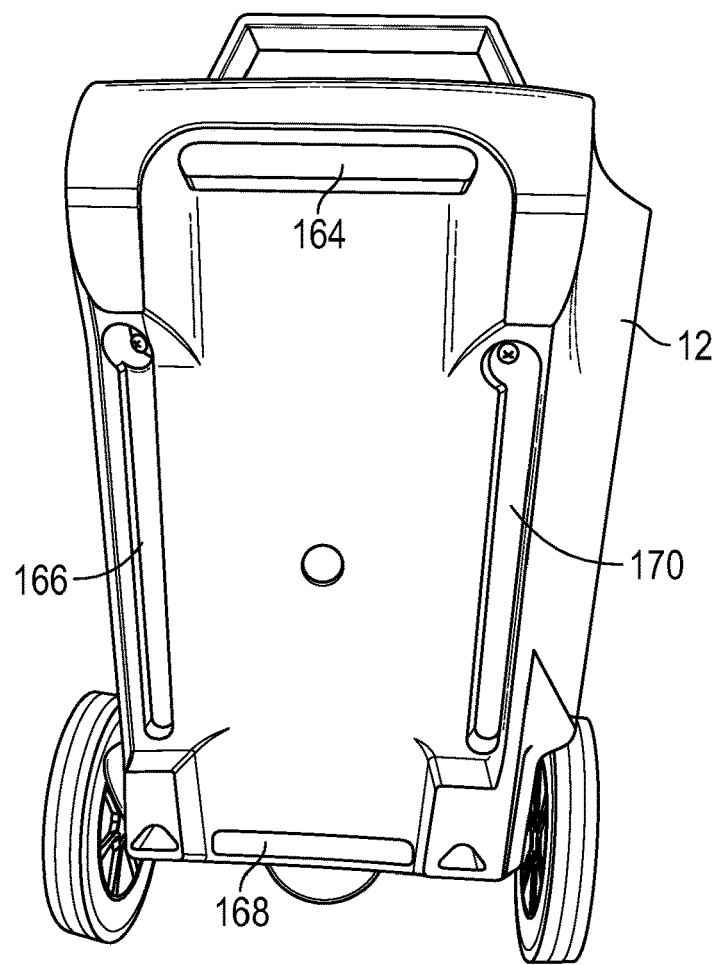
FIG. 14 is a bottom view of the lower unit of the insulation blowing machine of FIG. 1, illustrating the placement of grip structures.
Figure 15:
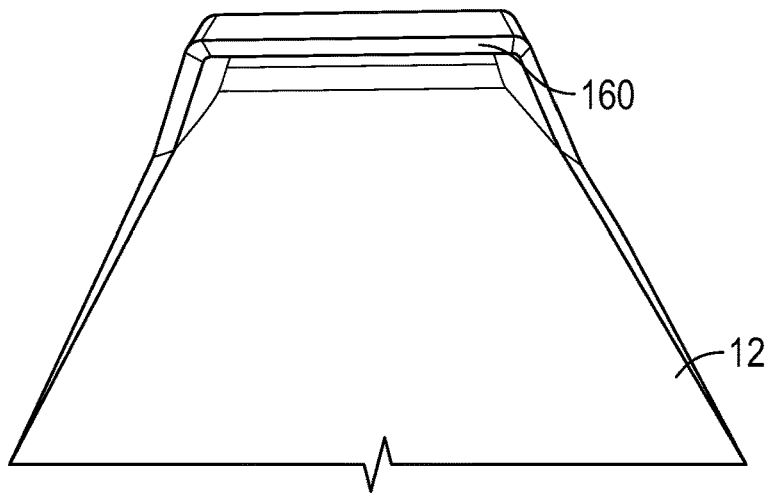
FIG. 15 is a perspective view of a portion of the lower unit of the insulation blowing machine of FIG. 1, illustrating placement of grip structures

Referring now to FIGS. 13-15, to facilitate additional ease of transport, the lower unit 12 includes a plurality of grip structures. A first grip structure 160 is positioned at an upper front location of the lower unit 12. A second grip structure 162 is positioned at an upper rear location of the lower unit 12. Third, fourth, fifth and sixth grip structures 164, 166, 168 and 170 are positioned at a bottom surface of the lower unit 12.

In the embodiment illustrated in FIGS. 13-15, the grip structures 160, 162, 164, 166, 168 and 170 are configured as recesses, thereby allowing receipt of the fingers of the machine user. However, it should be appreciated that in other embodiments, other structures such as for example handles, can be used.

In the embodiment illustrated in FIGS. 13-15, the grip structures 160, 162, 164, 166, 168 and 170 are molded into the structure forming the bottom of the lower unit 12, thereby forming an integral structure. In other embodiments, the grip structures 160, 162, 164, 166, 168 and 170 can be separate and discrete structures that are connected to the lower unit 12.

While the embodiment illustrated in FIGS. 13-15 shows the grip structures 160, 162, 164 and 168 as extending across the width of the lower unit 12 and the grip structures 166 and 170 as extending substantially across the length of the lower unit 12, it should be appreciated that in other embodiments the grip structures 160, 162, 164, 166, 168 and 170 can have any desired length and can be positioned at any desired location.

While the embodiment illustrated in FIGS. 13-15 shows the grip structures 160, 162, 164, 166, 168 and 170 as continuous elements, it should be appreciated that in other embodiments the grip structures 160, 162, 164, 166, 168 and 170 can be formed as discontinuous elements.

While the embodiment illustrated in FIGS. 15-17 shows a quantity of six (6) grip structures 160, 162, 164, 166, 168 and 170 in the illustrated locations, in alternate embodiments, any desired quantity of grip structures can used in any desired location.

The principle and mode of operation of the insulation blowing machine have been described in certain embodiments. However, it should be noted that the insulation blowing machine may be practiced otherwise than as specifically illustrated and described without departing from its scope.

What is claimed is:

1. A machine for distributing loosefill insulation material from a package of compressed loosefill insulation material, the machine comprising:
 a chute having an inlet end and outlet end, the inlet end configured to receive the package of compressed loosefill insulation material, a removable hose hub positioned within the chute, the removable hose hub configured for wrapping with a distribution hose, the removable hose hub further supported by opposing flange assemblies such that rotation of the hose hub results in rotation of the flange assemblies, each of the opposing flange assemblies having an inner disk-shaped segment connected to an outer disk-shaped segment, the removable hose hub having a longitudinal axis and configured for separation from the flange assembles and from the chute by movement along the longitudinal axis; and
 a lower unit configured to receive the compressed loosefill insulation material exiting the outlet end of the chute, the lower unit including a plurality of shredders and a discharge mechanism, the discharge mechanism configured to discharge conditioned loosefill insulation material into an airstream.

2. The machine of claim 1, wherein the opposing flange assemblies are positioned in longitudinal sides of the chute.

3. The machine of claim 2, wherein in an installed position in the chute, the removable hose hub prevents insertion of the package of compressed loosefill insulation material into the chute.

4. The machine of claim 1, wherein first and second ends of the removable hose hub include one or more lugs.

5. The machine of claim 4, wherein the one or more lugs at the first end and the one or more lugs at the second end of the removable hose hub are axially aligned.

6. The machine of claim 4, wherein the one or more lugs at the first end of the removable hose hub is seated between adjacent cogs of one of the flange assemblies.

7. The machine of claim 6, wherein the one or more lugs at the first end of the removable hose hub and the adjacent cogs of one of the flange assemblies form a clearance fit therebetween.

8. The machine of claim 4, wherein the one or more lugs at the second end of the removable hose hub seat between adjacent cogs of one of the flange assemblies.

9. The machine of claim 8, wherein the one or more lugs at the second end of the removable hose hub and the adjacent cogs of one of the flange assemblies form a clearance fit therebetween.

10. The machine of claim 1, wherein a step plate is configured to facilitate orienting the machine at an angle relative to a horizontal surface.

11. The machine of claim 10, wherein the step plate is connected to the lower unit.

12. The machine of claim 11, wherein the lower unit includes an axle housing configured to support the step plate.

13. The machine of claim 12, wherein the axle housing and the step plate are formed as a one-piece structure.

14. The machine of claim 11, wherein the step plate extends in a rearward direction away from the lower unit.

15. The machine of claim 1, wherein a plurality of grip structures are configured to ease transport of the lower unit.

16. The machine of claim 15, wherein the grip structures are configured to receive fingers.

17. The machine of claim 15, wherein one or more of the plurality of grip structures are positioned at an upper front location of the lower unit.

18. The machine of claim 15, wherein one or more of the plurality of grip structures are positioned at an upper rear location of the lower unit.

19. The machine of claim 15, wherein one or more of the plurality of grip structures are positioned at a bottom surface of the lower unit.

* * * * *